United States Patent
Shinzato

(10) Patent No.: US 10,402,449 B2
(45) Date of Patent: Sep. 3, 2019

(54) INFORMATION PROCESSING SYSTEM, INFORMATION PROCESSING METHOD, AND INFORMATION PROCESSING PROGRAM

(71) Applicant: Rakuten, Inc., Tokyo (JP)

(72) Inventor: Keiji Shinzato, Tokyo (JP)

(73) Assignee: Rakuten, Inc., Tokyo (JP)

( * ) Notice: Subject to any disclaimer, the term of this patent is extended or adjusted under 35 U.S.C. 154(b) by 509 days.

(21) Appl. No.: 15/105,840

(22) PCT Filed: Mar. 18, 2014

(86) PCT No.: PCT/JP2014/057323
§ 371 (c)(1),
(2) Date: Jun. 17, 2016

(87) PCT Pub. No.: WO2015/140922
PCT Pub. Date: Sep. 24, 2015

(65) Prior Publication Data
US 2017/0124120 A1    May 4, 2017

(51) Int. Cl.
*G06F 16/58* (2019.01)
*G06F 16/54* (2019.01)
(Continued)

(52) U.S. Cl.
CPC ........ *G06F 16/5866* (2019.01); *G06F 16/248* (2019.01); *G06F 16/54* (2019.01); *G06F 16/58* (2019.01); *G06F 16/951* (2019.01)

(58) Field of Classification Search
CPC .......... G06F 17/30268; G06F 16/5866; G06F 16/54; G06F 16/248; G06F 16/951; G06F 16/58
See application file for complete search history.

(56) References Cited

U.S. PATENT DOCUMENTS

2008/0152231 A1* 6/2008 Gokturk ............ G06F 17/30256
382/209
2012/0117051 A1* 5/2012 Liu ................... G06F 17/30967
707/707
(Continued)

FOREIGN PATENT DOCUMENTS

JP    2008-27154 A    2/2008
JP    2011-154638 A   8/2011
(Continued)

OTHER PUBLICATIONS

International Preliminary Report on Patentability, dated Sep. 29, 2016, from the International Bureau in counterpart International application No. PCT/JP2014/057323.
(Continued)

*Primary Examiner* — Cam Y T Truong
(74) *Attorney, Agent, or Firm* — Sughrue Mion, PLLC

(57) ABSTRACT

An information processing system according to one embodiment includes an extraction unit and a generation unit. The extraction unit extracts a word specified by a user and contained in a request transmitted from a user terminal and an image displayed as a choice on the user terminal in response to the request. The generation unit generates combination data by associating image data corresponding to the image and obtained from an image storage unit with a name based on the word.

13 Claims, 10 Drawing Sheets

(51) Int. Cl.
*G06F 16/248* (2019.01)
*G06F 16/951* (2019.01)

(56) References Cited

U.S. PATENT DOCUMENTS

| | | | | |
|---|---|---|---|---|
| 2012/0290589 A1* | 11/2012 | Kubo | ................ | G06F 17/30259 |
| | | | | 707/752 |
| 2014/0093175 A1* | 4/2014 | Morimoto | ......... | G06F 17/30554 |
| | | | | 382/195 |
| 2014/0129552 A1* | 5/2014 | Sinha | .................. | G06F 17/3053 |
| | | | | 707/724 |
| 2014/0344259 A1* | 11/2014 | Horling | ............... | G06F 17/3053 |
| | | | | 707/723 |

FOREIGN PATENT DOCUMENTS

| | | | |
|---|---|---|---|
| JP | 2012-68695 A | 4/2012 | |
| JP | 2013-37539 A | 2/2013 | |

OTHER PUBLICATIONS

Keiji Yanai, "Mining Visual Knowledge on the World Wide Web for Generic Image Classification", Transactions of the Japanese Society for Artificial Intelligence, 2004, pp. 429-439, vol. 19, No. 5.
International Search Report of PCT/JP2014/057323 dated Jun. 24, 2014.

* cited by examiner

*Fig.6*
| DATA ID | NAME (LABEL) | IMAGE DATA |
|---|---|---|
| 0001 | KETTLE |  |
| 0002 | WINE |  |
| 0003 | GLASSES |  |
| 0004 | HEADPHONE | 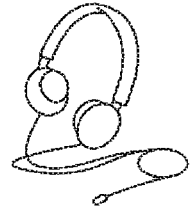 |
| 0005 | PEN | 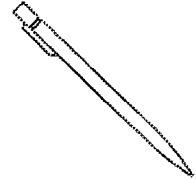 |

INFORMATION PROCESSING SYSTEM, INFORMATION PROCESSING METHOD, AND INFORMATION PROCESSING PROGRAM

CROSS REFERENCE TO RELATED APPLICATIONS

This application is a National Stage of International Application No. PCT/JP2014/057323 filed Mar. 18, 2014, the contents of all of which are incorporated herein by reference in their entirety.

TECHNICAL FIELD

One aspect of the present invention relates to an information processing system, an information processing method, and an information processing program for processing images.

BACKGROUND ART

There is a technique called generic object recognition that specifies the name of an object shown in an image. As an example of generic object recognition, an image features extraction device is disclosed in Patent Literature 1 below. This device generates features that characterize the content of an image based on the co-occurrence of local features in a peripheral region, which is a local region, of feature points detected from frame image data.

CITATION LIST

Patent Literature

PTL 1: JP 2013-037539 A

SUMMARY OF INVENTION

Technical Problem

In such generic object recognition, it is necessary to prepare in advance a large amount of data indicating combinations between images and names in order to allow a computer to do machine learning the distribution of local features for each object. However, it is not easy and takes time and effort to manually prepare such data in large quantities. It is thus desirable to automatically collect a combination of images and names.

Solution to Problem

An information processing system according to one aspect of the present invention includes an extraction unit configured to extract a word specified by a user and contained in a request transmitted from a user terminal and an image displayed as a choice on the user terminal in response to the request, and a generation unit configured to generate combination data by associating image data corresponding to the image and obtained from an image storage unit with a name based on the word.

An information processing method according to one aspect of the present invention is an information processing method performed by an information processing system with a processor, the method including an extraction step of extracting a word specified by a user and contained in a request transmitted from a user terminal and an image displayed as a choice on the user terminal in response to the request, and a generation step of generating combination data by associating image data corresponding to the image and obtained from an image storage unit with a name based on the word.

An information processing program according to one aspect of the present invention causes a computer to function as an extraction unit to extract a word specified by a user and contained in a request transmitted from a user terminal and an image displayed as a choice on the user terminal in response to the request, and a generation unit to generate combination data by associating image data corresponding to the image and obtained from an image storage unit with a name based on the word.

According to the above aspects, the correspondence between a word specified by a user and image data is obtained, and a name based on the word and the image data are associated with each other. It is thereby possible to automatically collect a combination of images and names without manually.

Advantageous Effects of Invention

According to one aspect of the present invention, it is possible to automatically collect a combination of images and names.

BRIEF DESCRIPTION OF DRAWINGS

FIG. 6 is a view showing an example of combination data.

DESCRIPTION OF EMBODIMENTS

Figure 1:
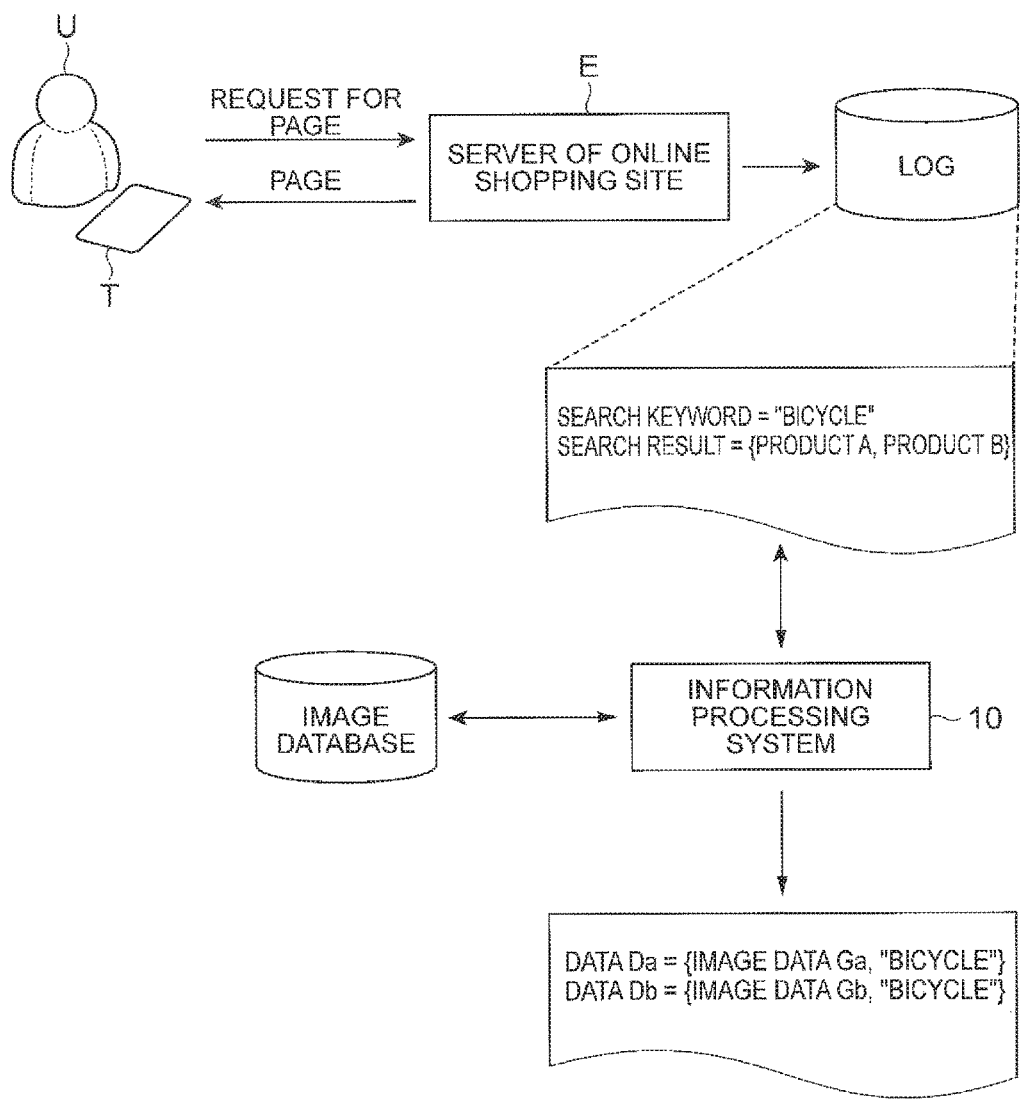
FIG. 1 is a conceptual diagram of processing in an information processing system according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an information processing system 10 according to an embodiment are described hereinafter with reference to FIGS. 1 to 8. The information processing system 10 is a computer system that generates combination data by associating image data and a name. In other words, the information processing system 10 is a computer system that labels image data.

"Image" in this specification is an image where an object is fixed on a medium so that it can be perceived by the human sense of sight. Further, "image data" is computer-processable data that represents an image. Thus, the image in this specification is recorded in a storage device such as a memory and output to an output device such as a monitor or a printer by processing of a processor, thereby becoming visible. The image may be a still image or a moving image. Examples of the still image are a photograph, a picture and the like, and examples of the moving image are a video, an animation and the like, though the type of the image is not limited thereto. The image may be obtained by electronic equipment such as a camera or a scanner or may be created by computer graphics.

"Object" in this specification is a photographic subject in other words. The type of an object is not particularly limited, and it may be an actual thing that exists in reality or a virtual thing that is visualized by drawing. For example, the object may be a product. "Product" in this specification is a given tangible or non-tangible object that can be traded at cost or at no cost. The tangible object is not particularly limited, and it may be movable property or immovable property. Further, the non-tangible object is also not particularly limited, and it may be provision of a given service, for example.

"Name" in this, specification is a letter string that identifies or sorts an image. Note that the name does not necessarily uniquely identify each image, and a plurality of image data correspond to one name in some cases. The name may be a noun or a part of speech other than a noun. The name may be a common name or a proper name. The common name is a name that widely refers to a thing which belongs to the same type, and it may be a common noun, for example. On the other hand, the proper name is a name that is used to distinguish a certain thing from another thing that belongs to the same type, and it may be a proper noun such as a personal name, a geographic name or a brand name, for example.

A name that is associated with image data of a certain object is the name of the object itself in some cases and the name of a part of the object (for example, a part that constitutes the object) in other cases. For example, the name "bicycle" is associated in some cases and the name "tire" is associated in other cases with the image data of a bicycle.

The information processing system 10 extracts the correspondence between image data and a word by referring to a log related to page processing, associates the image data and a name on the basis of the word determined to correspond to each other and thereby generates combination data.

FIG. 1 briefly shows the concept of processing in the information processing system 10 according to this embodiment. A user U can access an online shopping site using a terminal (user terminal) T, and search for a product, compare a plurality of products and purchase a product.

"User" in this specification is a person who uses information including image data that is provided from a given computer system. Although the example of FIG. 1 shows the case where a user uses an online shopping site for easier understanding, an online service that is used by a user is not limited thereto. A user can access the computer system by using his/her terminal. The type of a terminal is not particularly limited, and it may be a stationary or portable personal computer (PC), or a mobile terminal such as an advanced mobile phone (smart phone), a cellular phone or a personal digital assistant (PDA), for example. Note that, although one user U and one terminal T are shown in FIG. 1, a plurality of (for example, a large number of) users U and terminals T can exist in general.

The terminal T accesses a server E of an online shopping site in response to a user operation and requests a page, then receives a page from the server E and displays that page on a screen. By this process, a page containing an image is displayed on the terminal T of the user, for example. "Page" in this specification is an electronic document that is provided on the Internet. An example of the page is a webpage, though a structure to provide a page is not limited to a webpage. On the terminal T, the page may be displayed on a web browser or displayed on a screen implemented by an application program different from a web browser. "Page processing" in this specification indicates given processing related to the page. Examples of page processing are transmission of a request from the terminal T to the server E, generation of a page based on the request, and transmission of the generated page from the server E to the terminal T (response to the request). "Request" in this specification is a signal that is transmitted from a user terminal to a server in order to acquire a page from the server.

Each time page processing is performed between the terminal T and the server E, a log related to the page processing is written into a specified storage device. "Log" in this specification is a record where executed processing is described in detail at a specified level. A log is generally described in chronological order, though the way of describing a log is not limited thereto.

For example, processed input data, the type of processing, data acquired during processing, finally output data and the like are written as a log into a specified storage device. For example, examples of input data are URL (Uniform Resource Locator) of the next page, a parameter specified by a user, and a parameter automatically specified in the terminal T. An example of information indicating the type of processing is the name of a function or a procedure called and executed. Examples of data acquired during processing are data generated by processing and data read from a storage device (for example, a memory or a database) during processing. Examples of output data are URL of a page transmitted to the terminal T and data (for example, text data or image data) contained in the page. The example of the log shown in FIG. 1 shows that "bicycle" is specified as a search keyword and that products A and B are extracted as search results for the keyword.

The information processing system 10 extracts a word specified by a user and an image displayed corresponding to that word from the log, associates image data corresponding to that image with a name based on that word with each other and thereby generates combination data.

The way a user specifies a word is not limited. For example, a letter string that is input or selected by a user on the terminal T is an example of a word that is specified by the user. To be specific, a keyword that is input by a user in a text box on a page, a keyword that is selected by a user from choices in a list (for example, a product category selection field, a product tag selection field etc.) and the like can be processed as a word that is specified by the user.

Because the information processing system 10 cannot acquire image data from a log, the information processing system 10 reads the image data that matches the description of the log from an image database (image storage unit). The image database is a device that stores a record containing image data and one or more attribute values related to the image data. The attribute value may be a value indicating the characteristics or features of image data or a value indicating the characteristics or features of an object shown in image data. Examples of an attribute value for image data are the resolution of an image, creation time and date, a data size and the like. On the other hand, examples of an attribute value for an object are the name and the category of the object. When the object is a product, for example, a product name, a product category, a seller, a price and the like are examples of the attribute.

In the example of FIG. 1, the information processing system 10 first determines that the search keyword "bicycle" and the two products A and B correspond. Next, the information processing system 10 reads image data Ga and Gb respectively corresponding to the products A and B from the image database. Then, the information processing system 10 generates data Da where the keyword "bicycle" and the image data Ga are associated and data Db where the keyword "bicycle" and the image data Gb are associated. Note that, in this example, the information processing system 10 uses the search keyword (word) itself as the name. Those data Da and Db are combination data. In this specification, combination data indicating the association between image data X and a name Y is represented also as "{image data X, name Y}".

As described above, the online service that is used by a user is not limited to the one mentioned above, and therefore the content of the log is also not limited. The log may be generated from any online service as long as a word specified by a user and image data that is displayed on a screen corresponding to that word can be specified.

The information processing system 10 includes one or more computers and, when it includes a plurality of computers, the functional elements of the information processing system 10, which are described later, are implemented by distribution processing. The variety of each of the computers is not particularly limited. For example, a stationary or portable personal computer (PC) may be used, a work station may be used, or a mobile terminal such as an advanced mobile phone (smart phone), a cellular phone or a personal digital assistant (PDA) may be used. Alternatively, the information processing system 10 may be constructed by combining various types of computers. When using a plurality of computers, those computers are connected through a communication network such as the Internet or an intranet.

Figure 2:
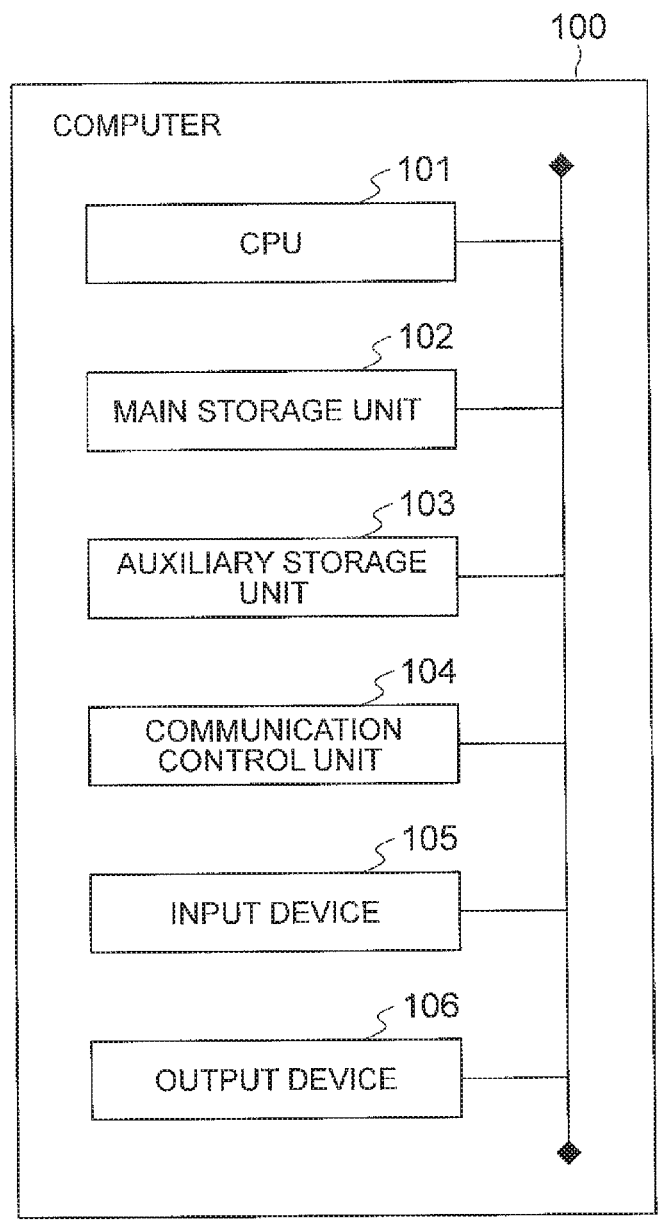
FIG. 2 is a view showing a hardware configuration of a computer to implement an information processing system according to an embodiment.

FIG. 2 shows a typical hardware configuration of each computer 100 in the information processing system 10. The computer 100 includes a CPU (processor) 101 that executes an operating system, an application program and the like, a main storage unit 102 such as ROM and RAM, an auxiliary storage unit 103 such as a hard disk or a flash memory, a communication control unit 104 such as a network card or a wireless communication module, an input device 105 such as a keyboard and a mouse, and an output device 106 such as a display or a printer. As a matter of course, hardware modules mounted thereon vary by the type of the computer 100. For example, while a stationary PC and a work station often include a keyboard, a mouse and a monitor as the input device and the output device, a smartphone often has a touch panel that functions as the input device and the output device.

The functional elements of the information processing system 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and databases required for processing are stored in the main storage unit 102 or the auxiliary storage unit 103.

Figure 3:
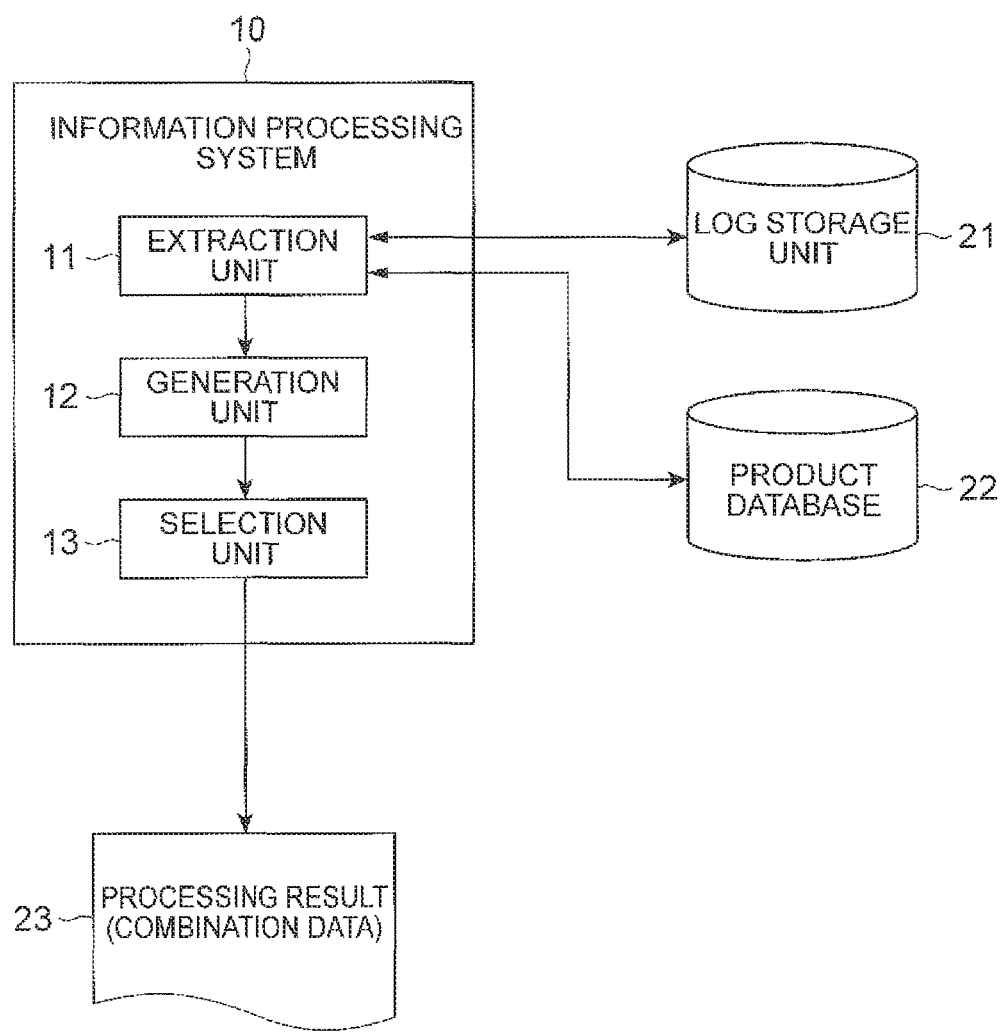
FIG. 3 is a block diagram showing a functional configuration of an information processing system according to an embodiment.

As shown in FIG. 3, the information processing system 10 includes an extraction unit 11, a generation unit 12 and a selection unit 13 as functional elements. Hereinafter, an example in which the information processing system 10 associates a name based on a word specified by a user with image data of a product by referring to a log that records processing in an online shopping site is described in consideration of easier understanding. Note that, however, an online service that generates a log, an object indicated by image data and the like are not particularly limited as described earlier.

The extraction unit 11 is a functional element that reads logs accumulated in a log storage unit 21 and extracts a word specified by a user and image data displayed corresponding to the word. The term "displayed" means that image data is displayed on a user terminal so that it is visible to the user. Further, "displayed corresponding to the word" means that image data obtained by certain processing using the word is displayed. Examples of the processing are search, collection, generation and the like, through not limited thereto. For example, in the case where the processing is search, when a user terminal transmits a request containing a word specified by a user, images are displayed on the user terminal as search results and/or choices in response to the request. The number of words specified by a user is not limited to one, and a plurality of words can be specified in one processing. In this specification, "displayed as choices" is the concept that includes being displayed in such a way that a user can directly select image data and being displayed in such a way that a user can indirectly select image data by selecting information (for example, a link indicated by a letter string) related to the image data.

First, the extraction unit 11 reads logs from the log storage unit 21 in accordance with an instruction input by an administrator of the information processing system 10 or a preset schedule. The range of logs read by the extraction unit 11 is not limited, and the extraction unit 11 may read all of the logs in the log storage unit 21, read only the logs written during a specified period in the past (for example, for the latest one month), or read only the logs related to specific processing, for example, Then, the extraction unit 11 extracts a word specified by a user and image data displayed corresponding to that word. In other words, the extraction unit 11 extracts a word specified by a user which is contained in a request transmitted from the user terminal and image data displayed on the user terminal as search results and/or choices in response to the request. A word and image data may correspond in any way, and therefore there are various techniques to extract the correspondence between a word and image data. In any way, the extraction unit 11 previously stores rule information indicating a rule about acquiring a word or image data from certain description in a log, and extracts the correspondence between a word and image data in accordance with the rule. Various exemplary techniques for extraction are described hereinafter.

[First Technique (Technique in Consideration of Display Only)]

The extraction unit 11 may simply extract a combination between a word specified by a user and image data displayed corresponding to that word. For example, the extraction unit 11 extracts a keyword specified by a user and one or more image data retrieved for the keyword from a log.

For example, it is assumed that the following three lines are obtained from a log. The first line of this example indicates a request from a user terminal, and the third line indicates images displayed on the user terminal as search results and/or choices in response to that request.

Search (category=null, Keyword="camera")
Get (product A, product B, product C)
CreatePage (Product="product A, product B, product C")

In this case, the extraction unit 11 acquires the keyword "camera" as a word specified by a user. Further, the extraction unit 11 specifies that three products A to C have been retrieved for the keyword and embedded in a page and this page (which is image data of the products A to C) has been displayed. This specification corresponds to processing of extracting one or more pairs of words and images. Then, the extraction unit 11 acquires three image data corresponding to the products A to C from a product database (image storage unit) 22. The product database 22 is one type of the image database, and it stores a record that at least contains image data showing a product and one or more product attribute values (product name, product category etc.) related to that image data. Note that, even if the image data has the same composition, a file of thumbnail images for screen display and a file of original product images are managed separately in some cases. Thus, there can be a case where an image file (image data) actually displayed on a user terminal and an image file (image data) read from the product database 22 are different from each other. In any case, the extraction unit 11 acquires the image data corresponding to the image displayed on the user terminal from the product database 22.

[Second Technique (Technique in Consideration of Operation after Display)]

The extraction unit 11 may extract a word specified by a user and image data displayed corresponding to that word and selected by that user. "Image data selected by a user" in this specification is the concept that includes both of image data directly selected by a user and image data indirectly selected by a user through selection of information (for example, a link indicated by a letter string) related to the image data. An example of indirect selection is the case where a link to a product page of a certain product is clicked on and thereby image data of that product is selected.

The extraction unit 11 may extract a keyword specified by a user and one or more image data retrieved for the keyword and then selected by the user from a log. For example, it is assumed that the following four lines are obtained from a log. The first line of this example indicates a request from a user terminal, and the third line indicates images displayed on the user terminal as search results and/or choices in response to that request.

Search (category=null, Keyword="camera")
Get (product A, product B, product C)
CreatePage (Product="product A, product B, product C")
Select (product B, product C)

In this case, the extraction unit 11 acquires the keyword "camera" as a word specified by a user. Further, the extraction unit 11 specifies that three products A to C have been retrieved for the keyword and embedded in a page, this page has been displayed, and then the products B and C (specifically, image data of the products B and C) have been selected by the user on that page. This specification corresponds to processing of extracting one or more pairs of words and images. Then, the extraction unit 11 acquires only two image data corresponding to the products B and C from the product database 22.

In this technique, the way a user selects specific images from one or more images displayed on the user terminal is not particularly limited.

Figure 4:
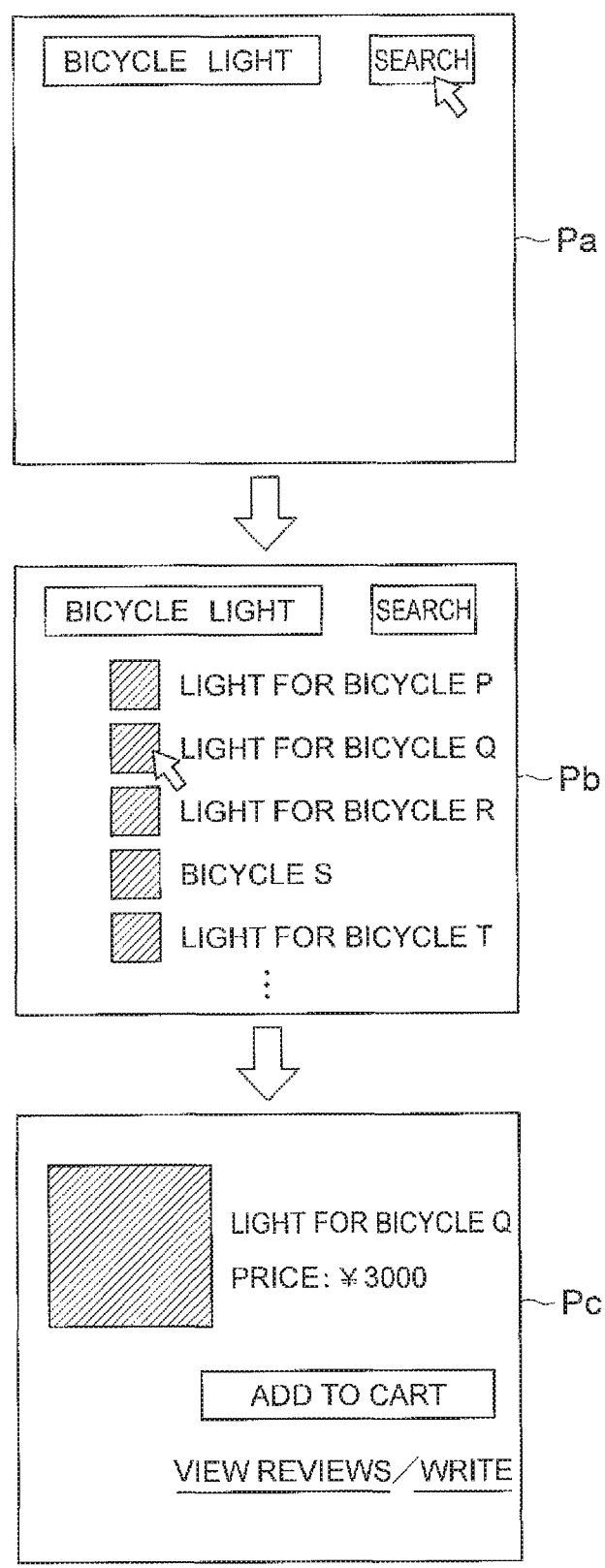
FIG. 4 is a view showing one example of page processing.

For example, when a user clicks on a link to a product page showing detailed information of a certain product in order to access the product page, the extraction unit 11 may determine that the user has selected image data of that product. In the example of FIG. 4, a user first performs a product search by specifying two keywords "bicycle" and "light" on a page Pa, and thereby a search result page Pb showing a plurality of products such as "light for bicycle P" and "light for bicycle Q" is displayed. After that, the user clicks on a link to "light for bicycle Q" in the page Pb, and thereby a product page Pc of "light for bicycle Q" is displayed. In this case, the extraction unit 11 acquires the two keywords "bicycle" and "light" as the words specified by the user from the log of such a process. Further, the extraction unit 11 acquires only the image data of the selected product "light for bicycle Q" from the product database 22.

Alternatively, when a user adds a certain product to a shopping cart or completes a purchase procedure of that product, the extraction unit 11 may determine that the user has selected image data of that product. In this case, the extraction unit 11 acquires the words specified by the user from the log of such a process. Further, the extraction unit 11 specifies the product that has been added to the shopping cart or the product for which the purchase procedure has been performed from the log and acquires the image data of that product from the product database 22.

Generally, in order to add a product to a shopping cart or complete a purchase procedure of that product on an online shopping site, a user needs to click on a link or a button related to the product a plurality of times. This means that the user needs to select that product a plurality of times in order to perform such a procedure.

To be specific, in order to add a product to a shopping cart, a user needs to select that product from search results obtained by specifying keywords (see FIG. 4) and then click on "Add to Cart" button (see FIG. 4) on a page of that product. Because an operation of clicking on the "Add to Cart" button is one way for a user to select a product, it can be regarded that the user selects the product (and its image data) twice in this case.

Further, in order to purchase a product, a user needs to select that product from search results obtained by specifying keywords (see FIG. 4), click on "Add to Cart" button (see FIG. 4) on a page of that product, and then finalize the purchase of that product. Because an operation of clicking on the "Purchase" button and finalizing the purchase is also one way for a user to select that product, it can be regarded that the user selects the product (and its image data) three times in this case.

It is thus possible to define the concept that includes the way of adding to a shopping cart, the way of performing a purchase procedure and the like. Specifically, the extraction unit 11 may extract a word specified by a user and image data displayed corresponding to that word and selected by the user a plurality of times. Note that the processing that a user selects image data a plurality of times is not limited to an operation related to a shopping cart and a purchase procedure, and it may be arbitrary processing.

Figure 5:
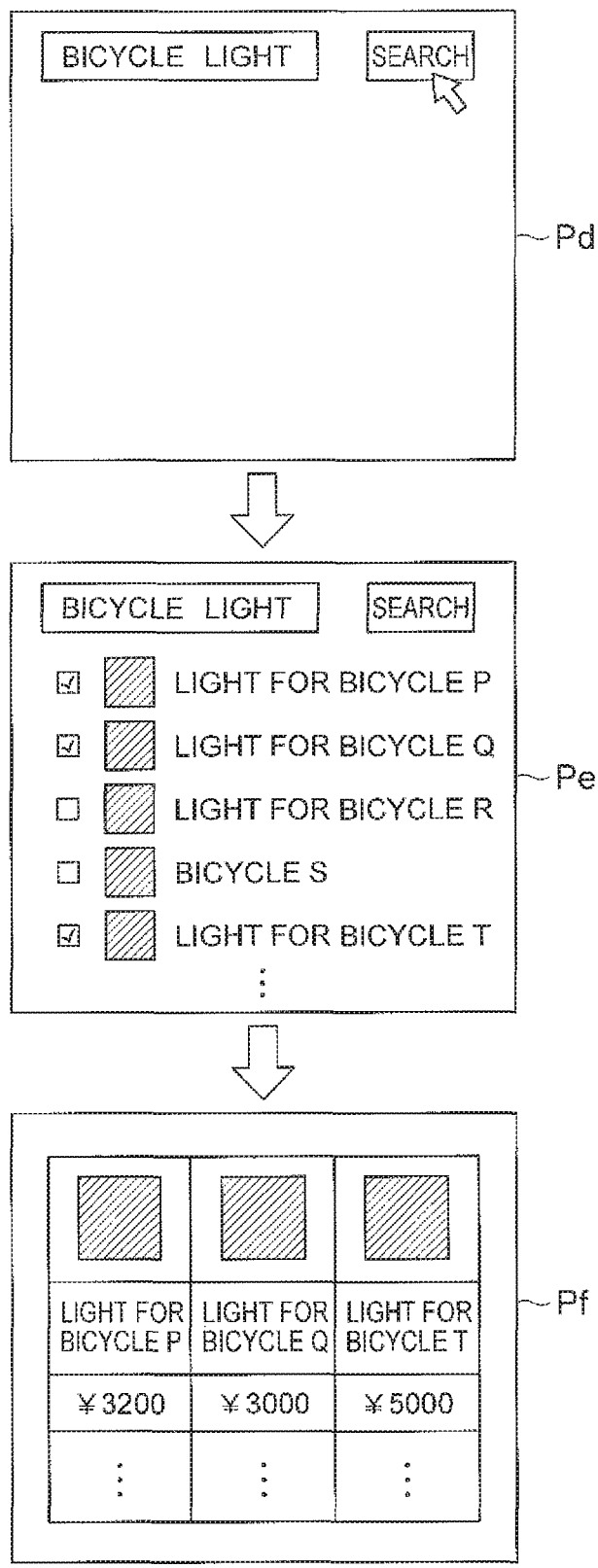
FIG. 5 is a view showing another example of page processing.

Alternatively, when a user specifies a plurality of products in order to compare the products, the extraction unit 11 may determine that the user has selected image data of the plurality of products. In the example of FIG. 5, a user first performs a product search by specifying the two keywords "bicycle" and "light" on a page Pd, and thereby a search result page Pe showing a plurality of products such as "light for bicycle P" and "light for bicycle Q" is displayed. After that, the user marks checkboxes for "light for bicycle P", "light for bicycle Q" and "light for bicycle T" in the page Pe and gives an instruction to perform comparison, and thereby a page Pf of a comparison table that contains image data of those three products is displayed. In this case, the extraction unit 11 acquires the two keywords "bicycle" and "light" as the words specified by the user from the log of such a process. Further, the extraction unit 11 acquires only the three image data corresponding to "light for bicycle P", "light for bicycle Q" and "light for bicycle T" from the product database 22. In this case, the two words "bicycle" and "light" specified by the user and the three image data corresponding to the selected "light for bicycle P", "light for bicycle Q" and "light for bicycle T" correspond to one another.

[Third Technique (Technique in Consideration of Display Time)]

The extraction unit 11 may extract a combination between a word specified by a user and image data displayed for a specified time or longer. For example, the extraction unit 11 extracts a keyword specified by a user and one or more image data retrieved for the keyword and displayed on the user terminal for a certain long length of time from a log.

For example, it is assumed that the following eight lines are obtained from a log. The part in parentheses in each line indicates time. The first line of this example indicates a request from a user terminal, and the third line indicates images displayed on the user terminal as search results and/or choices in response to that request. The eighth line also indicates a request from the user terminal.

[11:50:00] Search(category="camera", Keyword="single-lens reflex camera")
[11:50:02] Get(product W, product X, product Y, product Z)
[11:50:02] CreatePage(Product="product W, product X, product Y, product Z")
[11:50:03] SendPage
[11:50:15] RequestPage(Product="product X")
[11:52:30] RequestPage(Product="product Y")
[11:52:35] RequestPage(Product="product Z")
[11:53:10] Search(category=null, Keyword="camera")

In this case, the extraction unit 11 acquires the keywords "camera" and "single-lens reflex camera" as words specified by a user. Further, the extraction unit 11 specifies that four products W to Z have been retrieved for the keywords and embedded in a page and this page has been displayed. Further, the extraction unit 11 specifies that the page of the product X (i.e., the image data of the product X) has been requested and displayed for 2 minutes and 15 seconds, the page of the product Y (i.e., the image data of the product Y) has been requested and displayed for 5 seconds, and then the page of the product Z (i.e., the image data of the product Z) has been requested and displayed for 35 seconds. This specification corresponds to processing of extracting one or more pairs of words and images.

Then, the extraction unit 11 acquires the image data displayed for a period of a specified threshold or more. The threshold may be an absolute value or a relative value. For example, the extraction unit 11 may previously store the absolute value "60 seconds" as the threshold and acquire only the image data of the product X that has been displayed for that time or longer. Alternatively, the extraction unit 11 may acquire the n number of image data in descending order of the display time and, in this case, the value n is the threshold. If n=2 in the example of the log described above, the extraction unit 11 acquires two image data corresponding to the products X and Z. Alternatively, the extraction unit 11 may use the condition that simultaneously uses two thresholds: the absolute value of the display time and the top n number of values in ranking (relative values). For example, the extraction unit 11 may acquire the top three image data in descending order of the display time among the image data that has been displayed for 60 seconds or longer. Alternatively, the extraction unit 11 may refer to one or more logs indicating that a user has purchased a product in an online shopping site, set the shortest display time of the page of the product for which the purchase procedure has been performed as a threshold, and acquire the image data that has been displayed for a time equal to or longer than that threshold.

As described above, the method of extracting a word and image data is not limited. In any way, the extraction unit 11 extracts the word from each part of a log (one or more parts from which the word should be extracted) and extract the corresponding image data for the word extracted from each part. The extraction unit 11 outputs the extracted word and image data to the generation unit 12 in a format that indicates the correspondence between the word and the image data.

The generation unit 12 is a functional element that generates combination data by associating image data and a name based on a word. The combination data is data that indicates the correspondence between image data and a name. The way of associating image data and a name is not limited to one.

[First Technique (when there is One Candidate for Name)]

In the case where there is only one candidate for a name to be associated with image data, the generation unit 12 may simply associate that name with the image data. For example, when the image data Ga, Gb and Gc are extracted for the word "camera", the generation unit 12 generates three combination data {image data Ga, "camera"}, {image data Gb, "camera"} and {image data Gc, "camera"}. In this example, the generation unit 12 uses the word as a name without any change.

Alternatively, only in the case where the extracted word is a common name, the generation unit 12 may associate a name based on that word with image data. For example, the generation unit 12 may associate the word that is determined as a common name as a name with image data. In this case, the generation unit 12 previously stores a dictionary of at least one of common names and proper names and determines which of the extracted words is a common name by referring to that dictionary.

When the extracted word is a proper name only (for example, when a category is not specified (a specified category value is null) and only a proper name is specified as a search keyword), the generation unit 12 may select one common name corresponding to the proper name and generate combination data containing that common name. In this case, the generation unit 12 may previously store a dictionary indicating the correspondence between proper names and common names and acquire a common name from the proper name by using the dictionary. For example, it is assumed that only the search keyword "Bianchi" is extracted as a word, and image data Gs and Gt are extracted corresponding to that word. In this case, the common name "bicycle" that corresponds to the proper name "Bianchi" is selected by referring to the dictionary, and two combination data {image data Gs, "bicycle"} and {image data Gt, "bicycle"} are generated.

[Second Technique (when there are Several Candidates for Name)]

In the case where there are a plurality of candidates for a name to be associated with image data, the generation unit 12 associates one name selected from them with the image data. There are various method of selecting one name.

For example, the generation unit 12 may select a common name and associate that name with image data. For example, it is assumed that the proper name "Bianchi" (trademark or registered trademark; the same applies below) and the common name "bicycle" are extracted, and image data Gd is extracted corresponding to those two words. In this case, the generation unit 12 selects the common name "bicycle"

and generates one combination data {image data Gd, "bicycle" }. In this case, the generation unit 12 may determine which of the extracted words is a common name by using a dictionary of at least one of common names and proper names. Note that, in this example, the generation unit 12 uses the selected word as a name without any change.

Alternatively, the generation unit 12 may determine whether the word is specified as a category of an object or whether it is specified as a search keyword, and select the word specified as a search keyword. In this case, the generation unit 12 may make such determination and selection as a result that the extraction unit 11 estimates a word specified by a user and the way that word is specified from a log and adds the estimation result to each word. For example, it is assumed that the word "light" specified as a search keyword and the word "bicycle" specified as a category are extracted, and image data Gp, Gq and Gr are extracted corresponding to those two words. In this case, the generation unit 12 selects "light" and generates three combination data {image data Gp, "light"}, {image data Gq, "light"} and {image data Gr, "light"}. Note that, in this example, the generation unit 12 uses the selected word as a name without any change.

The generation unit 12 may use both of the technique of considering a common name/proper name and the technique of considering a search keyword/category. For example, it is assumed that the two words "Bianchi" and "light" specified as search keywords and the word "bicycle" specified as a category are extracted, and image data Gs and Gt are extracted corresponding to those three words. In this case, the generation unit 12 refers to the dictionary and eliminates "Bianchi" and also eliminates "bicycle" specified as a category, and thereby selects "light" as a name. Then, the generation unit 12 generates two combination data {image data Gs, "light" } and {image data Gt, "light" }. This corresponds to the processing of associating image data with a common name. Note that, in this example, the generation unit 12 uses the selected word as a name without any change.

The generation unit 12 may generate a name to be associated with image data by combining a plurality of words specified by a user. For example, the generation unit 12 may generate the name "light for bicycle" from the above-described "bicycle" and "light" and generate two combination data {image data Gs, "light for bicycle"} and {image data Gt, "light for bicycle" }. Further, as another example, the generation unit 12 may associate two names "light" and "light for bicycle" with each of the image data Gs and Gt and thereby generate two combination data.

In the case of combining a plurality of words, the generation unit 12 previously stores information of a rule related to a combination of words and combines words based on that information. This rule may be set by an arbitrary policy. For example, the rule is determined in consideration of the inclusion relation of words, the general idea and the like. As one example, because the name "light for bicycle" is appropriate and the name "bicycle for light" is generally not possible, the rule indicating that the name "light for bicycle" is to be generated from the two words "bicycle" and "light" is set in advance. Alternatively, the generation unit 12 may make a web search (for example, a search in an online shopping site or a search in all web sites on the Internet) by using a keyword generated from a plurality of words and select a keyword with the largest number of hits as a name. For example, the generation unit 12 generates the keywords "light for bicycle" and "bicycle for light" from the above-described "bicycle" and "light". Then, the generation unit 12 searches the online shopping site by using each of the keywords. If the number of hits for "light for bicycle" is 50 and the number of hits for "bicycle for light" is 25, the generation unit 12 selects the name "light for bicycle" and generates combination data by using this name.

In the case where only a proper name is specified as a search keyword and a category is specified, the generation unit 12 may select the word specified as a category. For example, it is assumed that the word "Bianchi" specified as a search keyword and the word "bicycle" specified as a category are extracted, and image data Gs and Gt are extracted corresponding to those two words. In this case, the generation unit 12 selects "bicycle" specified as a category and generates two combination data {image data Gs, "bicycle" } and {image data Gt, "bicycle"}. This corresponds to the processing of associating image data and attributes.

As described above, the procedure to generate combination data is not limited. In any way, the generation unit 12 generates one or more combination data based on a result (one or more pairs of names and images) obtained from each part in a log. As a result, each image data is labeled with a name. As described earlier, the number of names to be finally used for the generation unit 12 to generate combination data may be one or more than one. The generation unit 12 outputs the combination data to the selection unit 13.

FIG. 6 shows five examples of combination data. Although a data ID that uniquely identifies each combination data is shown in this example, the data ID is not an essential item. On the other hand, combination data may contain another arbitrary item.

The selection unit 13 is a functional element that selects combination data having image data where the frequency of occurrence of an element other than an object is lower than a specified threshold from one or more input combination data. The "frequency of occurrence of an element other than an object" is, in other words, the area of a region which an element other than an object occupies in the image indicted by image data (which is also referred to hereinafter simply as "image"). Alternatively, the frequency of occurrence is the degree of visibility of an element other than an object in the image.

The purpose of processing of the selection unit 13 is to acquire image data where an element other than an object rarely appears in the image. Because such image data clearly shows the object itself, it can be utilized in various situations. For example, in order to allow a computer to do machine learning the distribution of local features for each object, image data to serve as samples need to be prepared as training data in advance, and it is desirable that only an object is shown in the image data.

Figure 7:
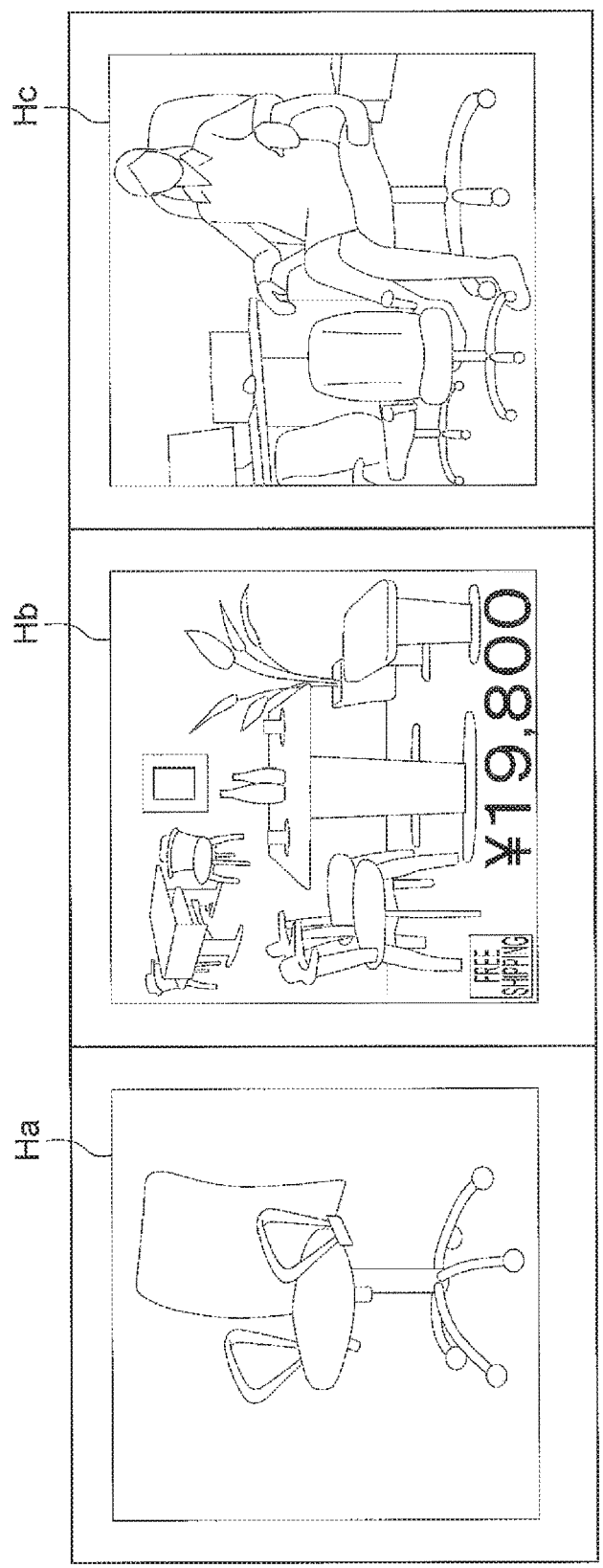
FIG. 7 is a view showing an example of image data.

FIG. 7 shows examples of typical images seen in an online shopping site. Images Ha, Hb and Hc are photographs of chairs as products, and thus the object of those three images is a chair. Because only the object is shown in the image Ha, it is an image suitable for machine learning or the like. On the other hand, in the image Hb, elements such as a table, a product price, a sales message "free shipping", and a table set of the same type appear other than the chair as the object, and the chair (object) is less visible. Further, in the image Hc, elements such as a desk, a monitor, a person sitting in a chair or a chair of the same type displayed in a superimposed manner appear, though a letter string does not appear, and the chair (object) is less visible as well. Because elements other than the chair are shown in the images Hb and Hc, if machine learning related to the image of the chair is performed based on those images Hb and Hc, there is a possibility that an incorrect model could be constructed.

Therefore, the images Hb and Hc are not images suitable for machine learning or the like. The selection unit 13 aims to discard combination data containing an image like the image Hb or Hc and to select combination data containing an image like the image Ha.

The selection unit 13 performs the following processing for each combination data.

Figure 8:
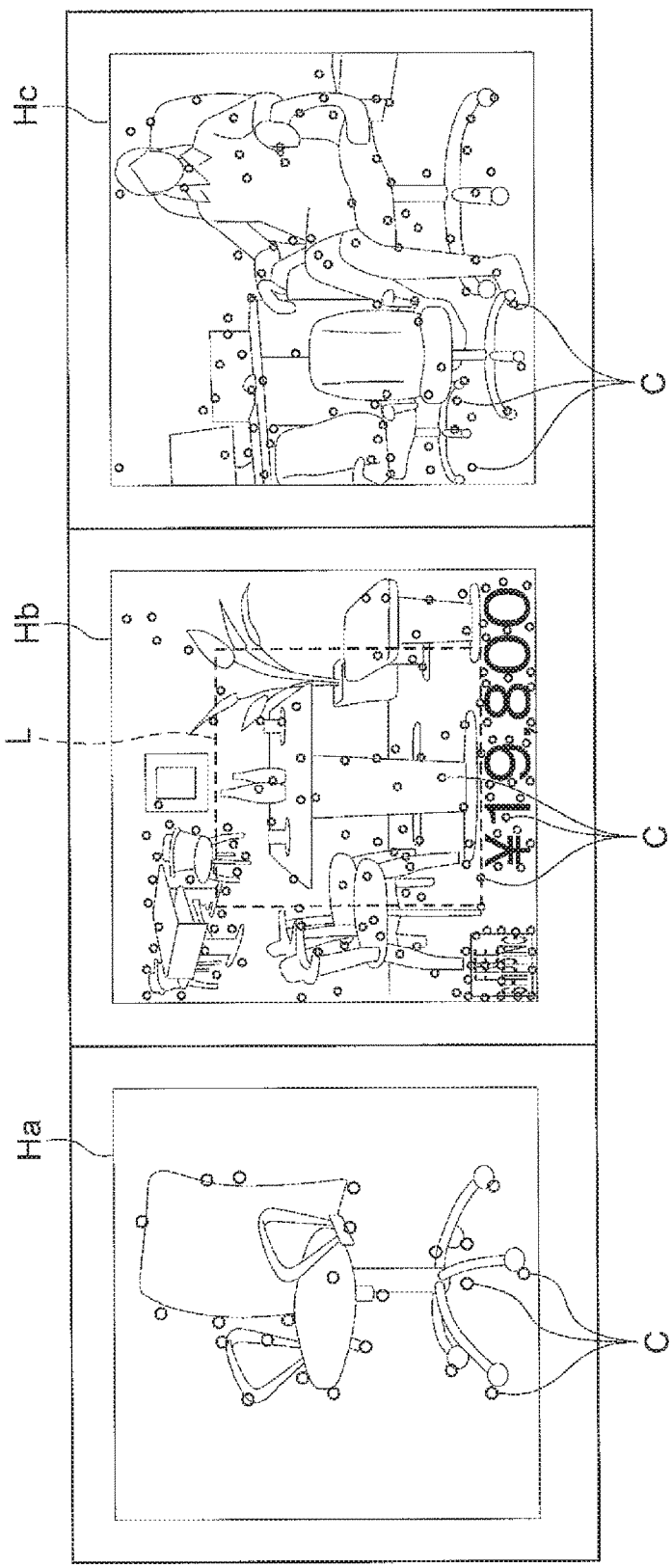
FIG. 8 is a view showing an example of image data from which feature points are extracted.

First, the selection unit 13 analyzes image data and extracts feature points in the image. The feature point extraction is known technology, and an arbitrary technique may be used. FIG. 8 shows the state where a large number of feature points C are extracted from each of the images Ha, Hb and Hc.

Then, the selection unit 13 determines which combination data is to be selected based on the distribution of the feature points. Different ways can be used for this determination, and several examples are shown below.

[First Technique (Determination by Density of Feature Points on Peripheral Part of Image)]

The selection unit 13 calculates the density of feature points in the peripheral part of an image. Then, the selection unit 13 determines whether the density is less than a specified threshold Ta. For this determination, the selection unit 13 previously stores the threshold Ta. When the calculated density is less than the threshold Ta, the selection unit 13 determines that the frequency of occurrence of elements other than the object is less than the specified threshold in the image, and selects the combination data having that image without discarding it. On the other hand, when the density is equal to or more than the threshold Ta, the selection unit 13 determines that the frequency of occurrence of elements other than the object is equal to or more than the specified threshold in the image, and discards the combination data having that image.

In the case of embedding supplementary information related to an object, the information is placed in the peripheral part of the image in many cases. For example, a price, a sales message, a table set of the same type and the like are displayed in the peripheral part (the region outside of the dotted line L) of the image Hb in FIG. 8. In such a image, the feature points C tend to appear frequently in its peripheral part. Thus, by taking the density of feature points in the peripheral part into consideration, it is possible to eliminate the image where the frequency of occurrence of elements other than an object is relatively high.

[Second Technique (Determination by Density of Feature Points in Whole Image)]

The selection unit 13 calculates the density of feature points in the whole image. Then, the selection unit 13 determines whether the density is less than a specified threshold Tb. For this determination, the selection unit 13 previously stores the threshold Tb. When the calculated density is less than the threshold Tb, the selection unit 13 determines that the frequency of occurrence of elements other than the object is less than the specified threshold in the image, and selects the combination data having that image without discarding it. On the other hand, when the density is equal to or more than the threshold Tb, the selection unit 13 determines that the frequency of occurrence of elements other than the object is equal to or more than the specified threshold in the image, and discards the combination data having that image.

There is a case where an image showing the situation of use of an object is used for easier understanding of the situation of use, and, in this case, various things often exist in the image. For example, the image Hc of FIG. 8 is a photograph showing the inside of an office, and various things such as a person, a desk and a monitor appear in that image. Because the feature points C for elements other than the object are also extracted in such an image, a large number of feature points C tend to be distributed all over the image. Thus, by taking the density of feature points in the whole image into consideration, it is possible to eliminate the image where the frequency of occurrence of elements other than an object is relatively high.

[Third Technique (Determination by Density in Both Peripheral Part of Image and Whole Image)]

The selection unit 13 may select only the combination data where the frequency of occurrence of elements other than an object is determined to be less than a specified threshold in each determination by using the above-described first and second techniques. In this case, it is possible to eliminate the combination containing the image Hb or Hc and select the combination containing the image Ha.

As described above, the selection unit 13 can select specific combination data by using various ways. Note that, because the selection unit 13 determines whether to discard or select combination data by comparing the density of feature points with a specified threshold, there is a possibility that the combination data that contains an image where an element other than an object appears could be selected by circumstances such as an extraction result of feature points, a value of a threshold or the like. However, by the processing of the selection unit 13, it is possible to efficiently obtain a large amount of combination data suitable for machine learning or the like.

The selection unit 13 outputs the selected combination data as a processing result 23. The processing result 23 may be output to any part. For example, the selection unit 13 may display the processing result 23 on a monitor or print it by a printer, write the processing result 23 on a text file, or store the processing result 23 in a storage device such as a memory or a database. Alternatively, the selection unit 13 may output the processing result 23 to another computer system (for example, a system for machine learning) through a communication network.

Figure 9:
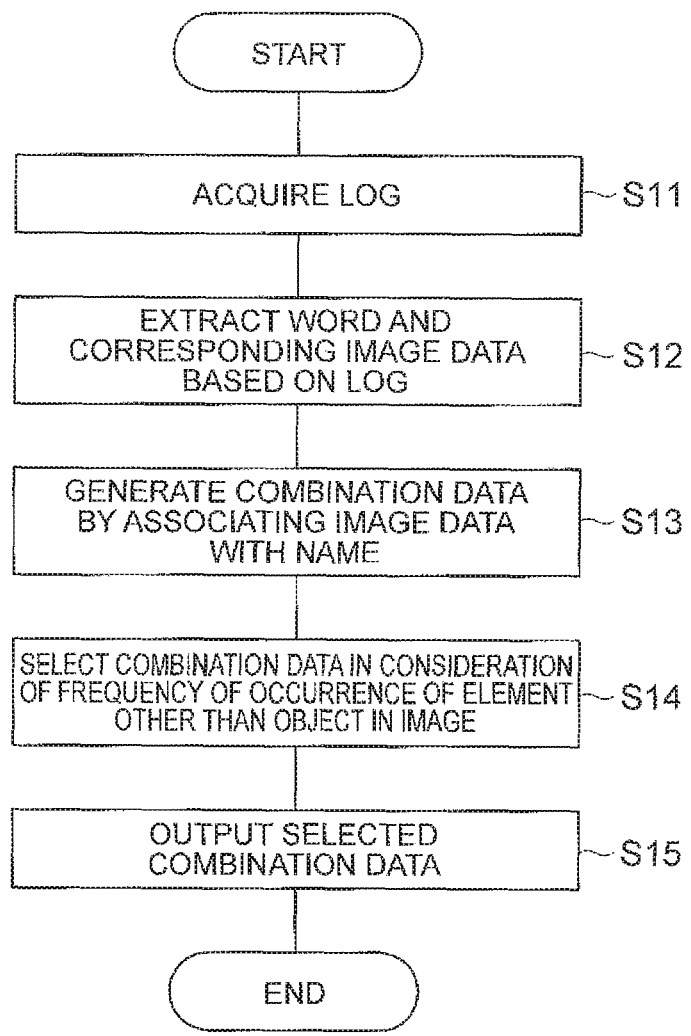
FIG. 9 is a flowchart showing an operation of an information processing system according to an embodiment.

Hereinafter, the operation of the information processing system 10 and an information processing method according to this embodiment are described with reference to FIG. 9.

First, the extraction unit 11 acquires a log from the log storage unit 21 (Step S11) and, based on the log, extracts a word specified by a user and image data displayed corresponding to that word (Step S12; extraction step). There are various ways for the extraction as described above. For example, the extraction unit 11 may take only the display of image data into consideration, take the operation of a user after image data is displayed into consideration, or take the display time of image data into consideration.

Then, the generation unit 12 associates the image data and a name based on the word and thereby generates combination data (Step 13; generation step). There are various ways also for the generation as described above. For example, when there is one candidate for a name, the generation unit 12 simply associates the name with each corresponding image data. When there are a plurality of candidates for a name, the generation unit 12 may use the technique of considering a common name/proper name, use the technique of considering a search keyword/category, or use both of those techniques. Further, the generation unit 12 may set a word specified by a user as a name or set a new letter string generated based on that word as a name.

After that, the selection unit 13 selects combination data in consideration of the frequency of occurrence of elements other than the object in the image (Step S14). There are various ways for the selection as described above. For example, the selection unit 13 may select combination data having image data where the density of feature points in the peripheral part of the image is low or select combination data having image data where the density of feature points in the whole image is low. Alternatively, the selection unit 13 may select combination data in consideration of both of those two types of density. Finally, the selection unit 13 outputs the selected combination data as a processing result (Step S15). The processing result may be used for generic object recognition by machine learning or used for another purpose.

Figure 10:
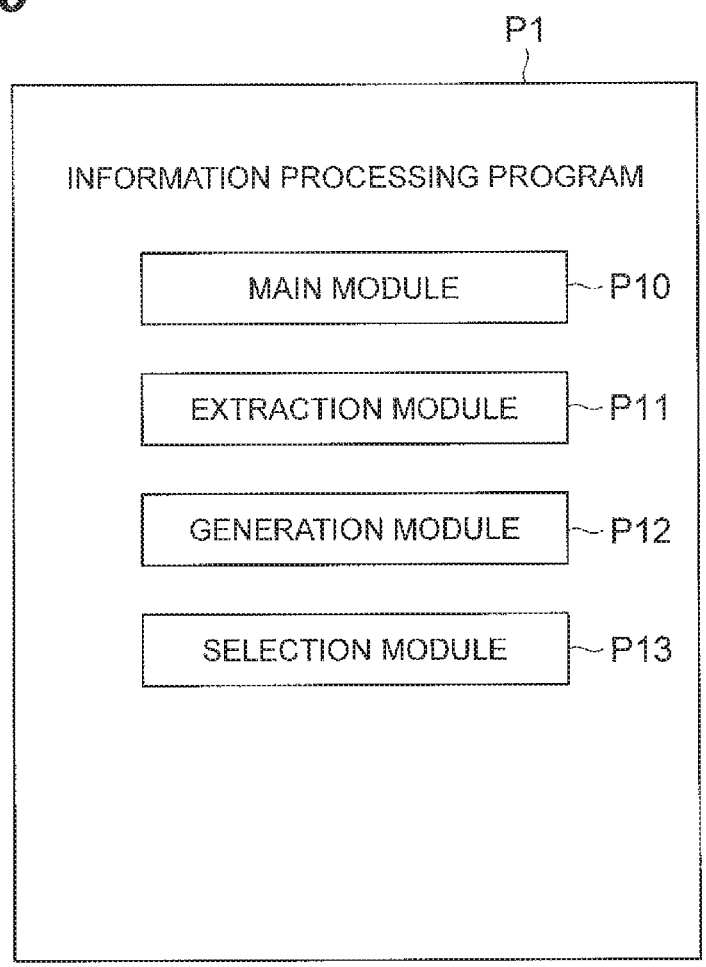
FIG. 10 is a view showing a configuration of an information processing program according to an embodiment.

An information processing program P1 for implementing the information processing system 10 is described hereinafter with reference to FIG. 10.

The information processing program P1 includes a main module P10, an extraction module P11, a generation module P12, and a selection module P13.

The main module P10 is a part that exercises control over the processing related to generation of combination data. The functions implemented by executing the extraction module P11, the generation module P12 and the selection module P13 are equal to the functions of the extraction unit 11, the generation unit 12 and the selection unit 13 described above, respectively.

The information processing program P1 is provided in the form of being recorded in a static manner on a tangible recording medium such as CD-ROM or DVD-ROM or semiconductor memory, for example. Further, the information processing program P1 may be provided as a data signal superimposed onto a carrier wave through a communication network.

As described above, an information processing system according to one aspect of the present invention includes an extraction unit configured to extract a word specified by a user and contained in a request transmitted from a user terminal and an image displayed as a choice on the user terminal in response to the request, and a generation unit configured to generate combination data by associating image data corresponding to the image and obtained from an image storage unit with a name based on the word.

An information processing method according to one aspect of the present invention is an information processing method performed by an information processing system including a processor, the method including an extraction step of extracting a word specified by a user and contained in a request transmitted from a user terminal and an image displayed as a choice on the user terminal in response to the request, and a generation step of generating combination data by associating image data corresponding to the image and obtained from an image storage unit with a name based on the word.

An information processing program according to one aspect of the present invention causes a computer to function as an extraction unit to extract a word specified by a user and contained in a request transmitted from a user terminal and an image displayed as a choice on the user terminal in response to the request, and a generation unit to generate combination data by associating image data corresponding to the image and obtained from an image storage unit with a name based on the word.

According to the above aspects, the correspondence between a word specified by a user and image data is obtained, and a name based on the word and the image data are associated with each other. It is thereby possible to automatically collect a combination of images and names without manually.

One way to generate combination data is to associate an attribute that is preset to an object of image data (which is an attribute that is set by a person who provides of image data) with the image data. For example, because a product category is generally set to each product in an online shopping site, combination data can be generated by associating the product category name with the image data of the product. However, because there is a case where a person who provides image data sets an inappropriate attribute (for example, there is a case where the setting of a product category is not appropriate in an online shopping site), if a preset attribute is used as it is, it results in generation of many combination data not suitable for use in machine learning.

On the other hand, in this embodiment, a name that is used for labeling of image data is the one specified by a user who views a page. In this manner, by labeling image data based on a user operation extracted from a log related to page processing, it is possible to generate combination data with higher accuracy than in the way used heretofore. By repeating the process of associating an image with a name and generating combination data, it is possible to obtain a large amount of combination data. For example, it is possible to automatically collect a large amount of training data suitable for machine learning.

In an information processing system according to another aspect, the extraction unit may extract the image displayed on the user terminal and then selected by the user. The fact that the displayed image is selected by the user can mean that it is highly probable that the user has determined that the image corresponds to the name specified by the user. By estimating the determination made by a person from the fact indicated by a log and thereby extracting only the image selected by the user, it is possible to automatically generate combination data with high accuracy.

In an information processing system according to another aspect, the extraction unit may extract the image displayed on the user terminal and then selected by the user for comparison with another image. The fact that the displayed image is selected by the user for comparison can mean that it is highly probable that the user has determined that the image corresponds to the name specified by the user. By estimating the determination made by a person from the fact indicated by a log and thereby extracting only the image selected by the user, it is possible to automatically generate combination data with high accuracy.

In an information processing system according to another aspect, the extraction unit may extract the image displayed on the user terminal and then selected by the user a plurality of times. The fact that the displayed image is selected by the user a plurality of times can mean that it is highly probable that the user has determined that the image corresponds to the name specified by the user. It is thereby possible to automatically generate combination data with high accuracy by the same reason as above.

In an information processing system according to another aspect, the extraction unit may extract the image displayed on the user terminal for a specified time or longer. The fact that the image is displayed for a certain long length of time can mean that it is highly probable that the user has determined that the image corresponds to the name specified by the user. By estimating the determination made by a person from the fact indicated by a log and thereby extracting only the image selected by the user, it is possible to automatically generate combination data with high accuracy.

In an information processing system according to another aspect, the generation unit may associate the image data with the name only when the word is a common name. By labeling image data by using a common name, it is possible to generate general-purpose combination data.

In an information processing system according to another aspect, words specified by the user may be a search keyword and an attribute of an object of image data, and the generation unit may associate the image data with the name based on the search keyword when the search keyword is a common name, and associate the image data with the name based on the attribute when the search keyword is a proper name. In this case, it is possible to generate combination data in accordance with search criteria. In general, a search keyword is more specific compared with an attribute (for example, a product category). Thus, when a search keyword is a common name, a name based on that keyword is associated with image data, and it is thereby possible to automatically generate combination data with high accuracy. On the other hand, when the search keyword is a proper name, image data is labeled with a name based on the attribute, and it is thereby possible to generate general-purpose combination data.

An information processing system according to another aspect includes a selection unit configured to analyze combination data where image data of an object and a name are associated and extract feature points in an image, and select the combination data when frequency of occurrence of an element other than the object is lower than a specified threshold.

An information processing method according to another aspect of the present invention is an information processing method performed by an information processing system including a processor, the method including a selection step of analyzing combination data where image data of an object and a name are associated and extracting feature points in an image, and selecting the combination data when frequency of occurrence of an element other than the object is lower than a specified threshold.

An information processing program according to one aspect of the present invention causes a computer to function as a selection unit to analyze combination data where image data of an object and a name are associated and extract feature points in an image, and select the combination data when frequency of occurrence of an element other than the object is lower than a specified threshold.

According to the above aspects, because only the combination data where the frequency of occurrence of elements other than an object is low is selected based on the distribution of feature points in the image, it is possible to acquire the image data where elements other than the object rarely appear in the image. Such image data can be used for various purposes.

An embodiment of the present invention is described in detail above. However, the present invention is not limited to the above-described embodiment. Various changes and modifications may be made to the present invention without departing from the scope of the invention.

The selection unit 13 is not essential in the information processing system 10. The selection unit 13 may be included in another computer system, not in the information processing system 10. For example, an information processing system that includes the extraction unit 11 and the generation unit 12 and another information processing system that includes the selection unit 13 may exist, and necessary data such as combination data may be transmitted between those systems through a communication network. Alternatively, none of systems may include the selection unit 13.

The purpose of use of the combination data is not particularly limited, and the combination data may be used for purposes other than machine learning for generic object recognition. Thus, the information processing system 10 is not a dedicated system for machine learning but a general purpose system.

Although the information processing system 10 extracts the correspondence between image data and a word by referring to a log in the above-described embodiment, the information processing system may extract the correspondence between image data and a word without using a log. To be specific, the extraction unit acquires, from the server, a request transmitted from the user terminal to the server and a page transmitted from the server to the user terminal in response to the request. The extraction unit then extracts a word specified by a user from the request and extracts the images displayed as search results and/or choices from the page. In this case, the extraction unit further extracts the image selected by the user or the image displayed on the user terminal for a specified time or longer by acquiring, from the server, data transmitted from the user to the server.

Although the extraction unit 11 acquires image data from the product database 22 in the above-described embodiment, the generation unit may acquire image data from the image storage unit.

REFERENCE SIGNS LIST

10 . . . information processing system, 11 . . . extraction unit, 12 . . . generation unit, 13 . . . selection unit, 21 . . . log storage unit, 22 . . . product database, P1 . . . information processing program, P10 . . . main module, P11 . . . extraction module, P12 . . . generation module, P13 . . . selection module

The invention claimed is:

1. A computer architecture comprising:
at least one processor; and
at least one memory storing computer program code, which when executed, cause the at least one processor to:
responsive to receiving a page request from a user terminal via a network communication interface that communicates with user terminals:
generate page information based on the page request from the user terminal,
transmit the page information to the user terminal via the network communication interface, and
store, in a log of the at least one memory, log information in chronological order related to the transmitted page information, wherein the log information includes a name based on a word specified by a user that is contained in the page request from the user terminal and a description of displayable image data, which corresponds to the word specified by the user, wherein the description of displayable image data is included in the page information for display on a screen of the user terminal, wherein the log information further indicates a rule for acquiring a word or image data from the description, wherein the page information includes the image data that matches a description of the log information from an image database, and wherein the image database stores a record containing the image data and one or more attribute values related to the image data;
extract, from the log in accordance with the rule, the word specified by the user and one or more image data that is displayed as a choice on the user terminal in response to a request and displayed for a length of time, wherein the extracting the one or more image data is based on a period of a threshold so that acquiring the one or more image data that has been displayed for a time equal to the threshold or longer than the threshold, wherein the threshold is an absolute value or a relative value;

in response to a result of determining that the extracted word is a common name corresponding a proper name by referring to a previously-stored dictionary of common names and proper names, associate the extracted word that is determined as the common name as a name with the one or more image data;

analyze the one or more image data to extract feature points in an image;

automatically generate, based on the extracted word that is determined as the common name and the one or more image data that is associated with the name, one or more combination data having high accuracy by indicating an association between the one or more image data corresponding to the extracted word and the name based on the specified word;

perform processing for the one or more combination data to determine whether the one or more combination data is to be selected based on a distribution of feature points of the one or more image data by calculating density of the feature points in a peripheral part of the image;

discard, based on a result of the determination that the calculated density in the peripheral part of the image is equal to or more than a specified threshold and frequency of occurrence of elements other than an object in the image is equal to or more than the specified threshold in the image, one combination data of the one or more combination data having image data;

select, based on a result of the determination that the calculated density is less than the specified threshold and frequency of occurrence of elements other than an object in the image is less than the specified threshold in the image, one combination data of the one or more combination data having image data; and output, to another computer system through a communication network, the selected one combination data having the image data as a processing result to be used for generic object recognition by machine learning.

2. The computer architecture according to claim 1, wherein the computer program code, which when executed, cause the at least one processor to extract a description of image data displayed on the user terminal that is selected by the user.

3. The computer architecture according to claim 2, wherein the computer program code, which when executed, cause the at least one processor to compare the extracted description of the image data displayed on the user terminal that is selected by the user with another image description.

4. The computer architecture according to claim 2, wherein the computer program code, which when executed, cause the at least one processor to extract multiple descriptions of multiples images that are displayed on the user terminal and then selected by the user.

5. The computer architecture according to claim 1, wherein the computer program code, which when executed, cause the at least one processor to extract a description of an image displayed on the user terminal for a specified time or longer.

6. The computer architecture according to claim 1, wherein the word specified by the user is a search keyword.

7. The computer architecture according to claim 1, wherein the word specified by the user is a letter string that is input or selected by the user on the user terminal.

8. The computer architecture according to claim 1, wherein the computer program code, which when executed, cause the at least one processor to read image data that matches an extracted description from the image database, which stores records containing pieces of image data and one or more attribute values related to the pieces of image data.

9. The computer architecture according to claim 1, wherein the one or more attribute values include at least one of: a resolution of an image, a creation time and date, or a data size.

10. The computer architecture according to claim 1, wherein the one or more attribute values include at least one of: a name of an object and a category of the object.

11. The computer architecture according to claim 1, wherein the one or more attribute values include at least one of: a product name, a product category, a seller, or a price.

12. An information processing method performed by an information processing system including a computer processor, the method comprising:

responsive to receiving a page request from a user terminal via a network communication interface that communicates with user terminals:
generating, by the computer processor, page information based on the page request from the user terminal,
transmitting, by the computer processor, the page information to the user terminal via the network communication interface, and
storing, in a log of a memory, log information in chronological order related to the transmitted page information, wherein the log information includes a name based on a word specified by a user that is contained in the page request from the user terminal and a description of displayable image data, which corresponds to the word specified by the user, wherein the description of displayable image data is included in the page information for display on a screen of the user terminal, wherein the log information further indicates a rule for acquiring a word or image data from the description, wherein the page information includes the image data that matches a description of the log information from an image database, and wherein the image database stores a record containing the image data and one or more attribute values related to the image data;

extracting, by the computer processor from the log in accordance with the rule, the word specified by the user and one or more image data that is displayed as a choice on the user terminal in response to a request and displayed for a length of time, wherein the extracting the one or more image data is based on a period of a threshold so that acquiring the one or more image data that has been displayed for a time equal to the threshold or longer than the threshold, wherein the threshold is an absolute value or a relative value;

in response to a result of determining that the exacted word is a common name corresponding a proper name by referring to a previously-stored dictionary of common names and proper names, associating by the computer processor the extracted word that is determined as the common name as a name with the one or more image data;

analyzing, by the computer processor, the one or more image data to extract feature points in an image;

automatically generating, by the computer processor, based on the extracted word that is determined as the common name and the one or more image data that is associated with the name, one or more combination data having high accuracy by indicating an association between the one or more image data corresponding to the extracted word and the name based on the specified word;

performing, by the computer processor, processing for the one or more combination data to determine whether the one or more combination data is to be selected based on a distribution of feature points of the one or more image data by calculating density of the feature points in a peripheral part of the image;

discarding, by the computer processor, based on a result of the determination that the calculated density in the peripheral part of the image is equal to or more than a specified threshold and frequency of occurrence of elements other than an object in the image is equal to or more than the specified threshold in the image, one combination data of the one or more combination data having image data;

selecting, by the computer processor, based on a result of the determination that the calculated density is less than the specified threshold and frequency of occurrence of elements other than an object in the image is less than the specified threshold in the image, one combination data of the one or more combination data having image data; and outputting, by the computer processor to another computer system through a communication network, the selected one combination data having the image data as a processing result to be used for generic object recognition by machine learning.

13. A non-transitory computer-readable recording medium storing an information processing program that, when executed by a computer, causes the computer to:

responsive to receiving a page request from a user terminal via a network communication interface that communicates with user terminals:

generate page information based on the page request from the user terminal, transmit the page information to the user terminal via the network communication interface, and store, in a log of a memory, log information in chronological order related to the transmitted page information, wherein the log information includes a name based on a word specified by a user that is contained in the page request from the user terminal and a description of displayable image data, which corresponds to the word specified by the user, wherein the description of displayable image data is included in the page information for display on a screen of the user terminal, wherein the log information further indicates a rule for acquiring a word or image data from the description, wherein the page information includes the image data that matches a description of the log information from an image database, and wherein the image database stores a record containing the image data and one or more attribute values related to the image data;

extract from the log in accordance with the rule, the word specified by the user and one or more image data that is displayed as a choice on the user terminal in response to a request and displayed for a length of time, wherein the extracting the one or more image data is based on a period of a threshold so that acquiring the one or more image data that has been displayed for a time equal to the threshold or longer than the threshold, wherein the threshold is an absolute value or a relative value;

in response to a result of determining that the exacted word is a common name corresponding a proper name by referring to a previously-stored dictionary of common names and proper names, associate the extracted word that is determined as the common name as a name with the one or more image data;

analyze the one or more image data to extract feature points in an image;

automatically generate based on the extracted word that is determined as the common name and the one or more image data that is associated with the name, one or more combination data having high accuracy by indicating an association between the one or more image data corresponding to the extracted word and the name based on the specified word;

perform processing for the one or more combination data to determine whether the one or more combination data is to be selected based on a distribution of feature points of the one or more image data by calculating density of the feature points in a peripheral part of the image;

discard, based on a result of the determination that the calculated density in the peripheral part of the image is equal to or more than a specified threshold and frequency of occurrence of elements other than an object in the image is equal to or more than the specified threshold in the image, one combination data of the one or more combination data having image data;

select, based on a result of the determination that the calculated density is less than the specified threshold and frequency of occurrence of elements other than an object in the image is less than the specified threshold in the image, one combination data of the one or more combination data having image data; and output, to another computer system through a communication network, the selected one combination data having the image data as a processing result to be used for generic object recognition by machine learning.

* * * * *